Jan. 6, 1959   A. MILLER   2,867,329
CENTRIFUGAL LAUNDRY EXTRACTOR MACHINE
Filed Aug. 7, 1957   4 Sheets-Sheet 4

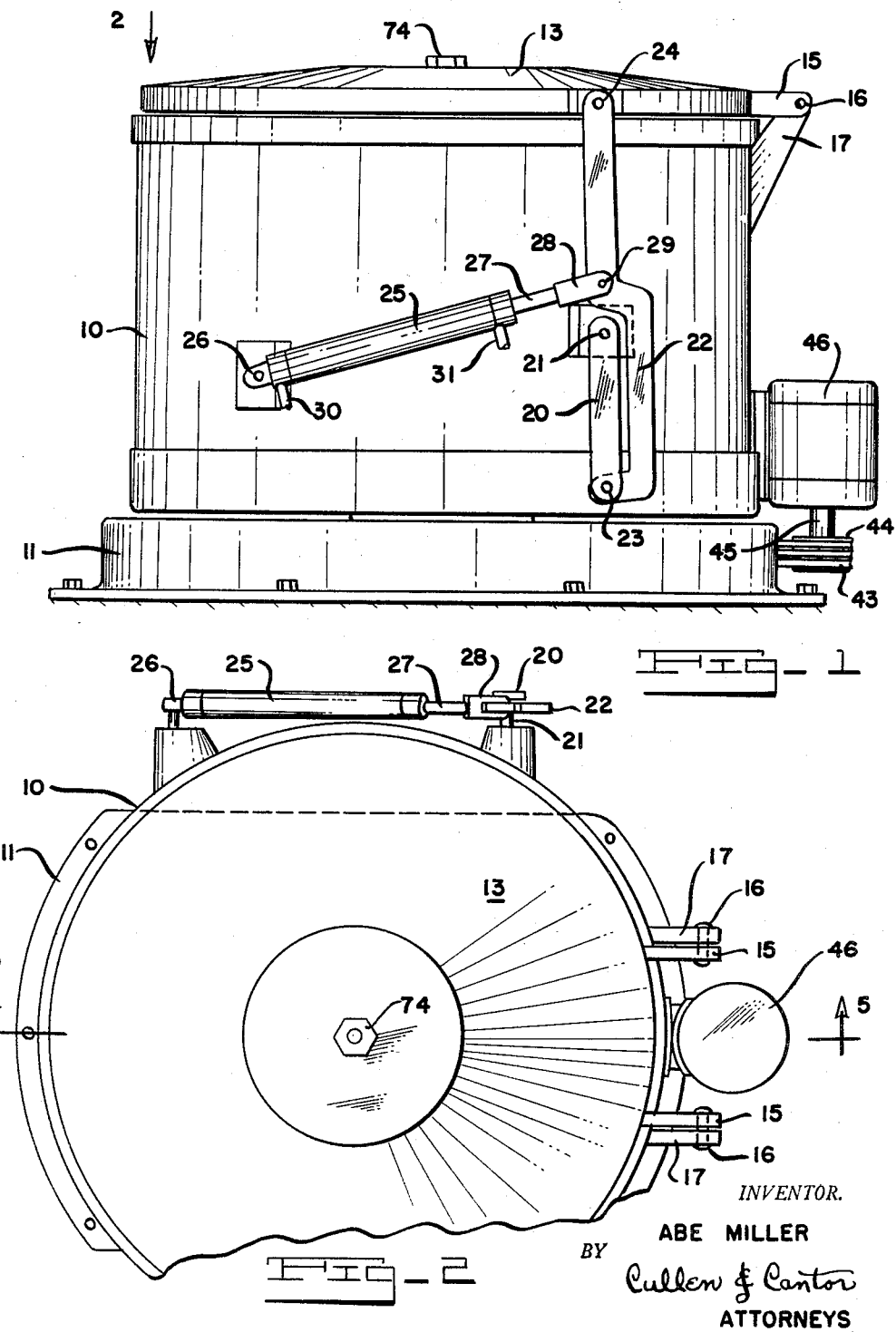

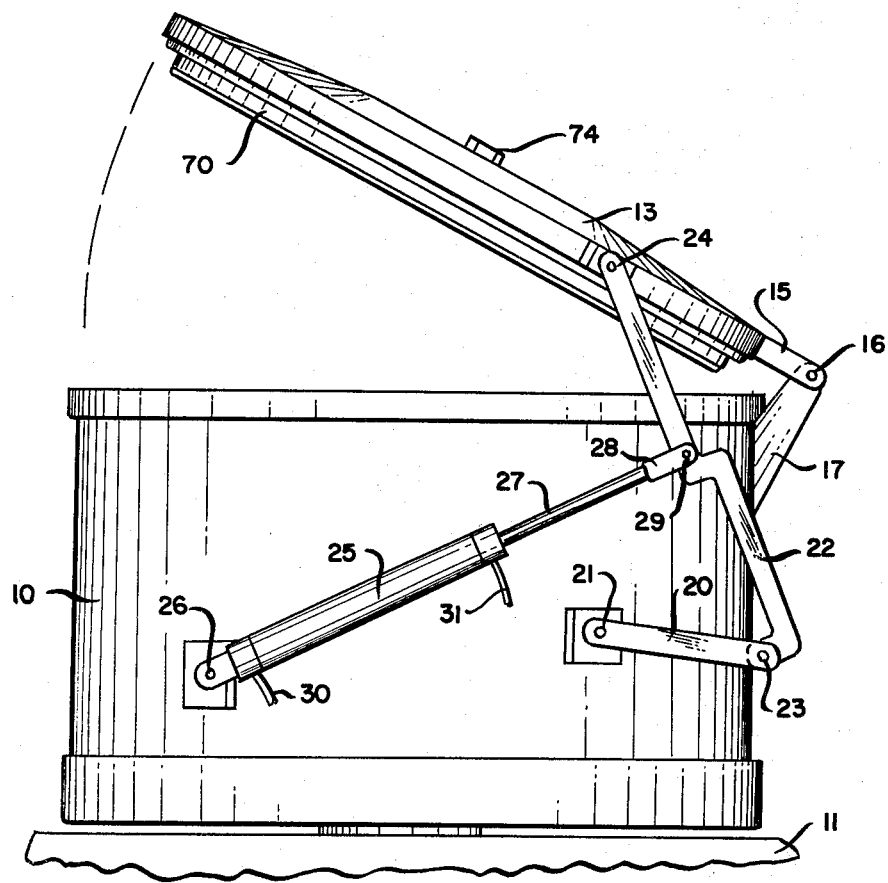
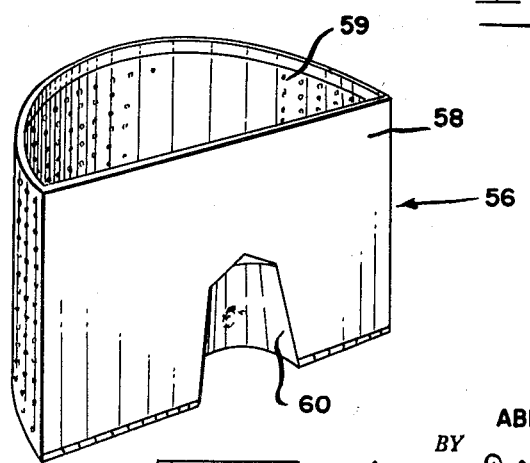

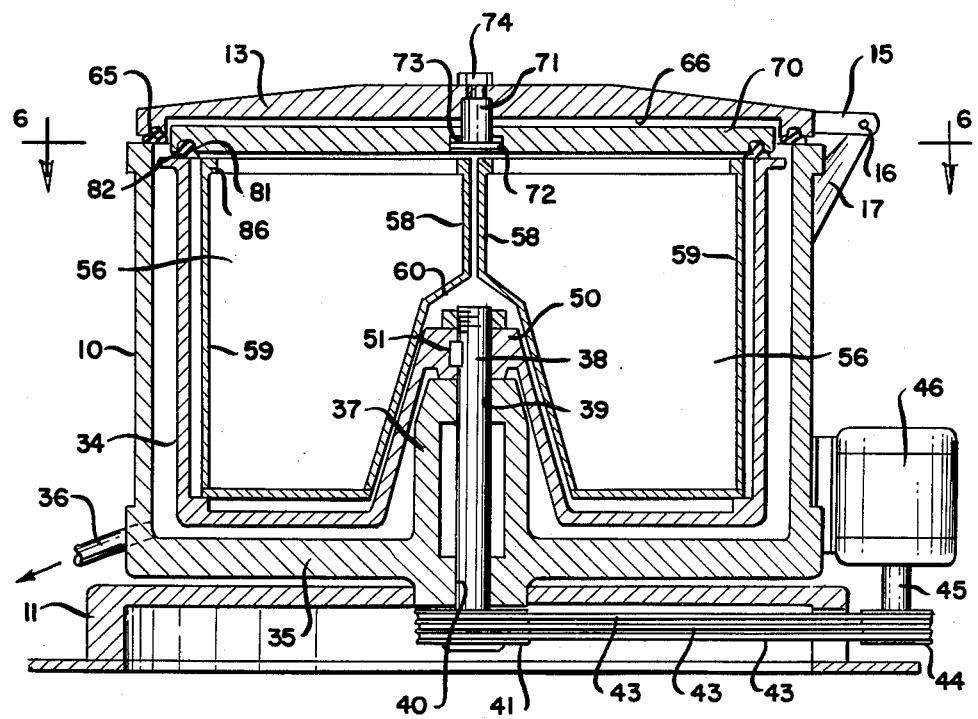
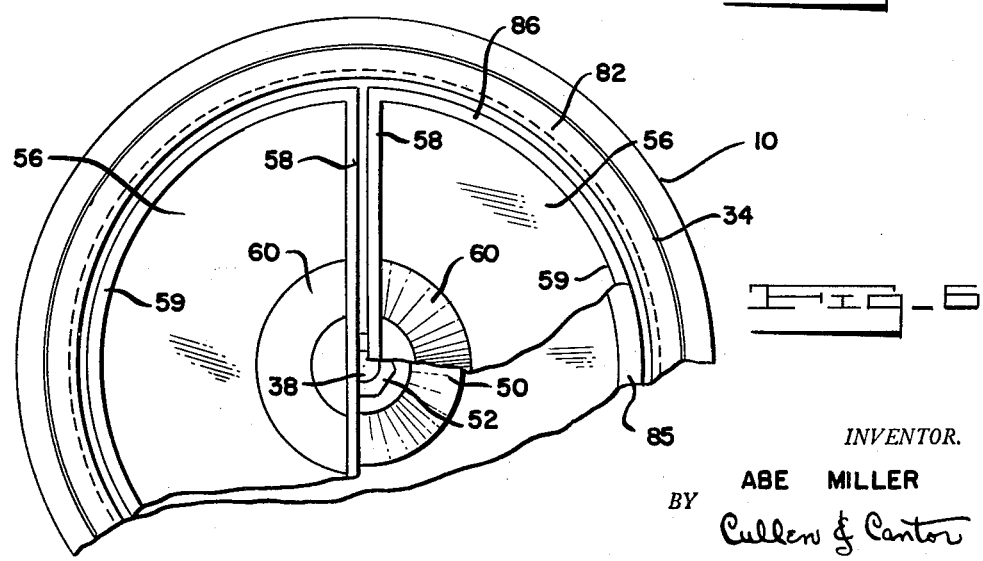

INVENTOR.
ABE MILLER
BY Cullen & Cantor
ATTORNEYS

United States Patent Office 2,867,329
Patented Jan. 6, 1959

2,867,329

CENTRIFUGAL LAUNDRY EXTRACTOR MACHINE

Abe Miller, Detroit, Mich., assignor to Miller Laundry Machinery Company, Detroit, Mich.

Application August 7, 1957, Serial No. 676,818

1 Claim. (Cl. 210—360)

This invention relates to a centrifugal laundry extractor machine and more particularly to a cover means arranged to simultaneously seal the outer shell and the outer and inner baskets of an industrial type machine used for extracting water from wet fabric.

In the conventional centrifugal laundry extractor machine, an outer container or shell is provided to contain an outer rotatable basket. An inner laundry holding basket, usually formed in two substantially identical separate semi-cylindrical halves, is placed within the outer basket and then the outer container or shell is covered and the outer basket is rapidly rotated to centrifugally remove water from the wet laundry. In this construction, a cover is required for each of the inner basket halves to prevent the wet laundry from spilling out of the top thereof.

Since these machines are quite large in size, sometimes being ten feet in outer diameter, the covers for the inner basket halves are extremely heavy and are difficulty to apply to and remove from the inner basket halves. The problem is aggravated by the fact that the high centrifugal force due to the fast rotation of the basket tends to throw the inner basket halves covers radially outward, and thus, heavy locking means are required to hold these covers in place during rotation.

The object of this invention is to eliminate the inner basket covers and instead provide a single cover which simultaneously seals and covers the tops of the outer and inner baskets and rotates therewith and which is carried by the outer container or shell cover so that both covers are simultaneously opened and closed.

A further object of this invention is to form a sealing cover for the inner and outer baskets which is arranged to seal tightly against the top of the outer basket when it is first closed and is further arranged to later seal against the top of the inner basket after the baskets are rotated. This object is achieved by having the inner basket halves loosely fitted within the outer basket and arranged to shift radially outward into contact with the outer basket wall under the application of centrifugal force due to rotation of the basket and at the same time slip beneath and press upwardly against a sealing ring formed on the inner cover. Thereby, the inner basket halves are sealed only during the time that they are rotated within the outer basket.

Further objects and advantages of this invention will become apparent upon reading the following description of which the attached drawings form a part.

In these drawings:

Fig. 1 is a side elevation view of the complete extractor machine;

Fig. 2 is a top plan view of the machine shown in Fig. 1 taken in the direction of arrow 2;

Fig. 3 is a view similar to Fig. 1, but shows the covers in the open position, and further, omits the motor which powers the basket rotation;

Fig. 4 is a perspective view of one of the inner basket halves;

Fig. 5 is a cross-sectional view taken in the direction of arrows 5—5 of Fig. 2, but with the motor, rotatable shaft, and belt powering means shown in full view;

Fig. 6 is a fragmentary top view of the extractor taken in the direction of arrows 6—6 of Fig. 5, but with the covers completely removed;

Figure 7:
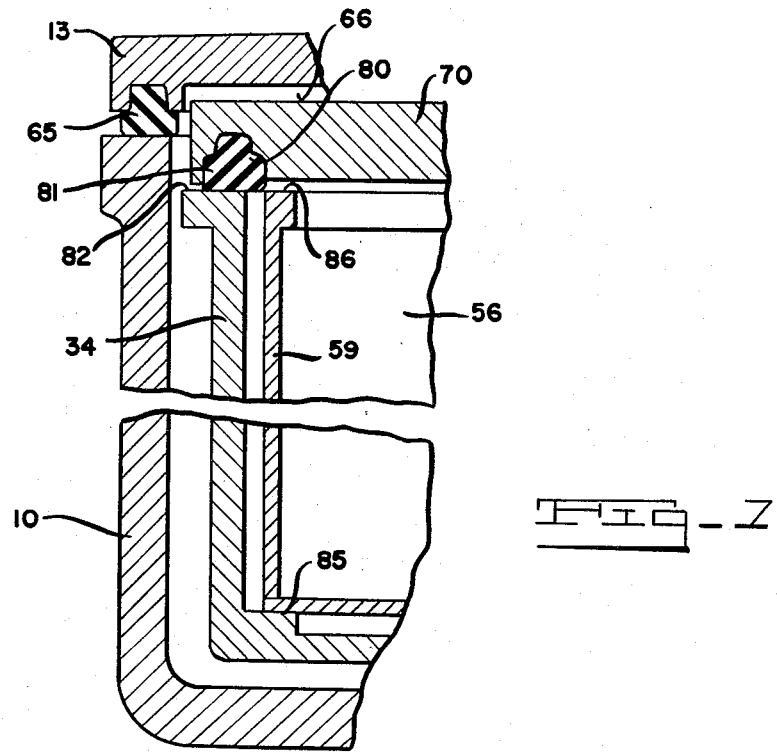
Fig. 7 is an enlarged fragmentary view showing a cross-section of the basket and cover walls at the start of an extractor operation.

With reference to the drawings, and particularly Figs. 1 and 2, a laundry machine extractor is illustrated which comprises an outer shell or container generally designated as 10, mounted upon a base 11 which is secured to the floor by means of bolts or the like, and having a cover 13. The outer shell or container is generally in the form of a cup or cylinder having a closed bottom and open top. The open top is covered by the disk shaped outer cover 13.

The outer cover 13 is arranged to be opened and closed mechanically and to accomplish this, hinge elements 15 are secured to the cover 13 and are pivotally connected at 16 to hinge elements 17 which are in turn mounted upon the outer shell 10. Thus, the cover pivots open about the pivots 16. The cover, being made of a large heavy metal disk, is opened mechanically by means of a power linkage system. This system includes a lifter link 20 which is pivotally connected to the shell at 21. A connector link 22 is pivotally connected at 23 to the lifter link 20 and its opposite end is pivotally connected at 24 to the cover 13. In actual practice, this lifter mechanism is provided in a pair with one mechanism being on each side of the shell.

A pneumatic or hydraulic cylinder 25, pivotally connected to the shell at 26 is so arranged that its piston rod 27 is connected to the connector link 22 through a yoke member 28 and a pivot connection 29 between the yoke and the link 22.

The hydraulic or pneumatic fluid is passed into the cylinder 25 at opposite sides of the piston (not shown) through hoses 30 and 31.

Referring to Fig. 3, it can be seen that when fluid power is applied through the hose 30, the piston rod 27 extends outwardly of the cylinder 25 and pushes against the connector link 22 which pivots with the lifter link 20 so that the cover 13 pivotally opens. In order to close the cover, the reverse operation is followed, by passing fluid into hose 31 to retract the pistin rod 27 and thereby swing the linkages back into their closed position. The linkages are so arranged, that in the closed position, the cover is past the dead center of the linkages so that the cover is tightly locked in place.

Next, referring to Fig. 5, the outer shell is provided with an outer basket 34 fitted within the outer shell and this outer basket is arranged to rotate rapidly about its center axis. The outer basket 34 is made of a perforate material so that water may pass therethrough to land upon the floor 35 of the outer shell and then eventually be drained out through the drain opening connection 36.

In order to rotate the outer basket, the shell 10 is provided with a hub 37 rising above the floor 35 and through this hub a rotatable shaft 38 is passed. The shaft fits through bearing openings 39 and 40 formed in the hub 37.

To rotate the shaft, a sheave is connected to the lower end thereof and drive belts 43 pass around the sheave to a motor driven sheave 44 secured to the end of a shaft 45 of an electric motor 46. Thus, the motor driven rotation of the sheave 44 rotates the shaft 38.

The outer basket 34 is provided with a central axially arranged socket hub 50 which fits over the hub 37 of the shell, and through which the shaft 38 passes. The shaft 38 is then keyed by means of a key 51 to the outer basket hub 50 and the outer basket is held upon the shaft by means of a nut or the like 52 threadedly engaged with the end of the shaft 38. Thus, the outer basket 34 rotates with the shaft 38 which is arranged axially thereof.

The wet laundry is placed within the extractor within the inner basket halves 56. These halves are substantially identical and in the form of half cylinders with flat walls and half cylindrical walls as illustrated in Fig. 4. In Fig. 4 the inner basket half 56 is shown as having a flat central wall 58 and an outer half cylindrical wall 59. This half is open at the top and closed at the bottom and is provided with a socket portion 60. The walls 59 are perforate so that water may pass therethrough from the wet laundry and then out of the machine.

The inner basket halves may be removed from the outer basket and brought to the washing machine within a commercial laundry and then filled up with wet laundry. Thereafter, they may be replaced into the extractor. Usually, it is preferable to form casters on the floors of these basket parts since they are normally quite large and extremely difficult to move about except upon their own wheels.

While the following features are not shown in the drawings, they are included as conventional; namely, the basket halves 56 are equipped with aligning dowels at their upper straight edges and with clamps whereby two basket halves may be aligned with and clamped to each other in a single extractor; in addition, each basket half has its bottom hinged along the straight edge to provide a dump bottom construction. All of the foregoing is conventional and hence not here illustrated.

Figure 8:
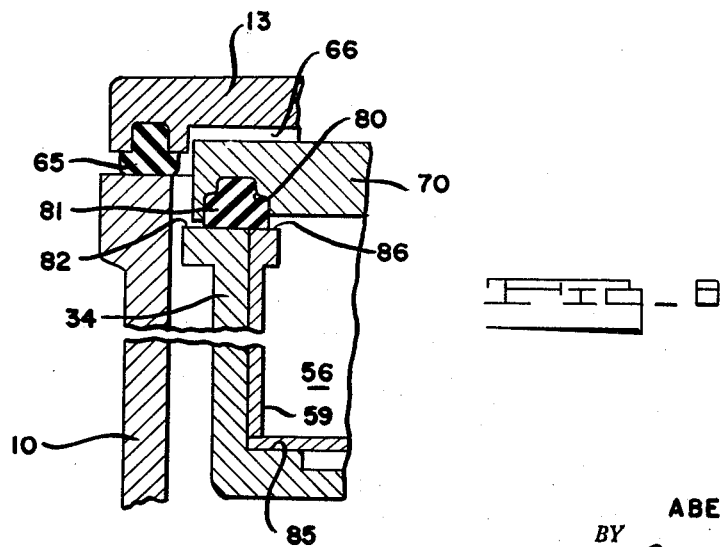
Fig. 8 is a view similar to Fig. 7, but shortened considerably, and illustrates the sealing of the baskets during rotation of the outer basket.

With reference to Figs. 5, 7 and 8, the inner and outer baskets and outer shells are sealed first by means of the outer shell cover 13 pressing against the top edge of the shell 10 through a sealing ring 65 formed of some resilient material. The outer cover 13 is reduced in cross-section at the center thereof to form a socket 66 to receive an inner cover 70. The inner cover is in the form of a large circular disk. This disk is carried by the outer cover by means of a central mounting means which permits the inner cover 70 to rotate relative to the outer cover.

One simple mechanical means suitable for this purpose, is a central shaft 71 having a head 72 fitted within a socket 73 formed in the bottom of the inner cover and with the shaft being secured through a nut 74 and a threaded end engaging the nut to the outer cover. With this construction, raising the outer cover 13 also raises the inner cover 70. Likewise, closing the covers closes first the outer cover 13 and also the inner cover, with the inner cover having a certain amount of vertical play relative to the outer cover and being rotatable about the shaft 71 relative to the outer cover.

The inner cover is provided with a peripheral channel 80 having a resilient strip or sealing ring 81 fitted therein. This sealing ring extends completely around the circumference of the inner cover and is arranged to press against the top edge 82 of the outer basket 34.

The inner basket parts, are normally spaced away from the wall of the outer basket 34 and are rested upon a ledge 85 formed on the floor of the outer basket at the angle between the floor and the vertical wall of the outer basket 34. The top edges 86 of the inner basket halves are arranged substantially coplanar with the top edge 82 of the outer basket.

When the outer basket is rapidly rotated, the two inner basket halves move outwardly radially due to centrifugal force until the outer and inner baskets are in wall to wall contact.

Figs. 5 and 7 show the baskets before rotation and Fig. 8 shows the inner and outer baskets in face to face contact during rotation.

Before such rotation, the sealing strip or ring 81 contacts only the top of the outer basket 34 and tightly seals against the top. (See Fig. 7.) However, the sealing ring extends inwardly of the basket a short distance and is so arranged, that when the inner basket halves move radially outwardly because of centrifugal force, top edges 86 slide underneath the sealing ring 81 and are tightly sealed by this sealing ring.

Thus, it can be seen that the inner basket is sealed by a tight seal and by a top cover during the time of rotation when such a cover and sealing is required. However, during the non-rotation periods, the inner basket is not sealed and thus may be easily inserted loosely into the outer basket and easily removed from the outer basket because of the loose fit between the inner and outer baskets.

In operation, the inner basket parts are loaded with wet laundry at the laundry washing machines and then are rolled or otherwise carried to the extractor. They are inserted into the extractor by means of a suitable hoist or crane. Once the two basket halves are inside the outer basket, and are loosely fitted therein, the covers are closed by means of retracting the piston rod 27 within the air or fluid cylinder 25 to thereby pivot the linkages 20 and 22 to close the covers tightly. In this position, the outer cover 13 is tightly sealed against the top edge of the outer shell 10 through its resilient sealing ring 65. Likewise, the inner cover 70 is tightly sealed against the top edge 82 of the outer basket 34 through its sealing ring 81. The inner basket parts are loosely fitted within the outer basket at this time.

At this point, the motor 46 is turned on and through its sheaves 41 and 44 and belts 43, the shaft 38 is rapidly rotated to thus rotate the outer basket 34. This likewise carries the inner basket parts 56 rapidly about and the centrifugal force causes the inner basket halves to shift outwardly relative to the outer basket and thus come into tight face to face contact therewith.

During this face to face contact period, the sealing strip 81 likewise seals the top edges of the inner basket halves. After a sufficient number of rotations for a sufficient period of time to remove the water from the wet fabric, the machine is stopped and the cover is opened simultaneously and the inner baskets are removed with the laundry.

During the rotation of the outer and inner baskets, the inner cover 70 rotates therewith and maintains a tight seal. Because the inner cover 70 seals against the top edges of the inner and the outer baskets, separate covers for the inner basket halves are completely eliminated. This elimination of the inner basket covers permits a greater capacity for the machine by permitting the inner basket halves to be loaded right up to their very tops with wet laundry.

This invention may be further developed within the scope of the following attached claim. Accordingly, it is desired that the foregoing description be read as being merely illustrative of an operative embodiment of this invention and not in a strictly limiting sense.

I claim:

A laundry extractor having an outer cylindrical shell, a disc shaped cover therefor, and an outer basket fitted within the shell; means to rotate the outer basket within the shell; an inner basket loosely fitted within the outer basket and comprising two separate halves, the inner basket top edge being substantially coplanar with the outer basket top edge and its outer diameter being less than the inner diameter of the outer basket, the inner basket halves shifting radially outwardly against the outer basket under the influence of centrifugal force caused by rotating the outer basket with the inner basket therein, an outer basket disc shaped cover for covering the outer basket and being under and secured to the shell cover and being provided with a continuous annular sealing strip secured thereto at its outer periphery and against its bottom wall and arranged to rest on the top edge of the outer basket and beneath the outer basket cover, said sealing strip being of such a radial dimension as to extend inwardly of the outer basket to seal also against the top edge of the inner basket when the inner basket halves are shifted against the outer basket by centrifugal force, but to clear the inner basket halves when the inner basket is normally inserted within the outer basket and before the outer basket is so rotated.

References Cited in the file of this patent

UNITED STATES PATENTS

| | | |
|---|---|---|
| Re. 18,036 | Nelson | Apr. 7, 1931 |
| 1,314,708 | Schwarz et al. | Sept. 2, 1919 |
| 1,705,361 | Graydon | Mar. 12, 1929 |
| 1,995,926 | Kirby | Mar. 26, 1935 |
| 2,045,986 | Gould | June 30, 1936 |
| 2,059,461 | Johnson | Nov. 3, 1936 |
| 2,138,334 | Becquet | Nov. 29, 1938 |
| 2,534,286 | Maitzen | Dec. 19, 1950 |
| 2,539,533 | Douglas | Jan. 30, 1951 |
| 2,575,039 | Barnes | Nov. 13, 1951 |